US012617321B2

(12) United States Patent

Fitzpatrick et al.

(10) Patent No.: US 12,617,321 B2
(45) Date of Patent: May 5, 2026

(54) VEHICLE SEAT SUPPORT ELEMENT SUSPENSION MEMBRANE

(71) Applicant: Faurecia Sièges d'Automobile, Nanterre (FR)

(72) Inventors: Robert Fitzpatrick, Holland, MI (US); Didier Duriez, Le Plessis-Pâté (FR); Claude Duboulet, Etrechy (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 178 days.

(21) Appl. No.: 18/496,082

(22) Filed: Oct. 27, 2023

(65) Prior Publication Data

US 2024/0140285 A1    May 2, 2024

(30) Foreign Application Priority Data

Oct. 28, 2022    (FR) ..................................... 22 11272

(51) Int. Cl.
    *B60N 2/70*        (2006.01)
    *B60N 2/56*        (2006.01)
    *B60N 2/00*        (2006.01)

(52) U.S. Cl.
    CPC ......... *B60N 2/5685* (2013.01); *B60N 2/7094* (2013.01); *B60N 2/0033* (2023.08); *B60N 2/70* (2013.01)

(58) Field of Classification Search
    CPC .. B60N 2/5685; B60N 2/7094; B60N 2/0033; B60N 2/0034; B60N 2/70
    See application file for complete search history.

(56) References Cited

U.S. PATENT DOCUMENTS

| | | | | |
|---|---|---|---|---|
| 2,119,023 | A | 5/1938 | Pickard | |
| 5,573,269 | A * | 11/1996 | Gentry | .............. B60R 21/01516 |
| | | | | 177/144 |
| 11,267,380 | B2 * | 3/2022 | Oomen | ................ B60N 2/5685 |
| 2013/0134745 | A1 * | 5/2013 | Aoki | .................... B60N 2/0034 |
| | | | | 297/180.12 |
| 2015/0061345 | A1 * | 3/2015 | Van Der Linden | ...... H05K 1/09 |
| | | | | 29/850 |

(Continued)

FOREIGN PATENT DOCUMENTS

| | | |
|---|---|---|
| DE | 1092322 B | 11/1960 |
| EP | 2829434 A1 | 1/2015 |

OTHER PUBLICATIONS

French Search Report corresponding to application FR2211272, dated Apr. 24, 2023, 2 pages.

*Primary Examiner* — Syed A Islam
(74) *Attorney, Agent, or Firm* — Reising Ethington P.C.

(57) ABSTRACT

A suspension membrane of a vehicle seat support element includes a fabric made of plastic material extending between a first face and a second face and having at least a first layer made of plastic material that has an outer face forming the first face and an inner face opposite the outer face, and a second layer made of plastic material that has an outer face forming the second face and an inner face opposite the outer face, the inner faces of the first layer and of the second layer being applied against one another. The suspension membrane further includes at least one electrical circuit having at least one electrical component and a power lead to the component, extending between a part of the inner faces of the first layer and of the second layer.

10 Claims, 4 Drawing Sheets

(56)     References Cited

U.S. PATENT DOCUMENTS

2020/0039399 A1     2/2020  Oomen et al.
2023/0144393 A1*    5/2023  Kawada ................... A47C 7/62
                                                      177/136

* cited by examiner

VEHICLE SEAT SUPPORT ELEMENT SUSPENSION MEMBRANE

TECHNICAL FIELD

The present invention relates to a suspension membrane of a vehicle seat support element.

The invention also relates to a seat support element comprising such a suspension membrane.

BACKGROUND

It is known to provide a suspension membrane in a vehicle seat support element, such as the seat backrest, against which the padding of the support element is applied in order to improve the comfort of an occupant of the seat. Such a suspension membrane is generally formed of a plurality of tensioned metal rods in the armature of the backrest.

In addition, it is known to provide a plurality of electrical circuits in the support element in order to implement various functions in or on the support element. Thus, the support element may for example comprise a heating or vibrating element to improve the comfort of an occupant of the seat, a device for controlling an airbag, various sensors and light indicators, etc.

However, the assembly of such a support element is complex, requiring the assembly of the various constituent elements of the support element one after another.

To simplify this assembly, it is known to overmold certain components with the padding, but such a method remains complex and is not suitable for all the components of the seat. Furthermore, the suspension membrane must always be assembled on the reinforcement independently of the rest of the support element.

SUMMARY

One of the aims of the invention is to overcome these disadvantages by proposing a support layer with a simplified structure and which is able to integrate other functions of a vehicle seat support element.

To this end, embodiments of the invention relate to a suspension membrane of a vehicle seat support element, comprising a fabric made of plastic material extending between a first face and a second face and comprising at least a first layer made of plastic material, comprising an outer face forming the first face and an inner face opposite the outer face, and a second layer made of plastic material comprising an outer face forming the second face and an inner face opposite the outer face, the inner faces of the first layer and of the second layer being applied against one another, and at least one electrical circuit, comprising at least one electrical component and a power lead to said component, extending between a part of the inner faces of the first layer and of the second layer.

Thus, the suspension membrane, instead of being formed by a plurality of independent rods, is formed by joined layers made of plastic material, which makes it possible to mount the single-piece suspension membrane onto the armature and to integrate electrical components into the suspension membrane in order to further simplify the mounting of the support element in which the suspension membrane is provided.

The suspension membrane may further comprise one or more of the following features, considered alone or according to any technically conceivable combination:

the electrical circuit is printed on the inner face of the first layer;

the first layer and the electrical circuit form a flexible printed circuit board;

the electrical circuit is made of a conductive metallic material;

the electrical circuit comprises at least one connection terminal electrically connected to the power lead, said connection terminal emerging outside the fabric made of plastic material;

the fabric made of plastic material extends between at least two rigid mounting elements attached to opposite edges of the fabric made of plastic material, said fabric being taut between said mounting elements when the suspension membrane is mounted in a seat support element;

the mounting elements each comprise at least one attachment element for attaching the suspension membrane to an armature of a seat support element;

a plurality of electrical circuits extend between some of the inner faces of the first layer and of the second layer, each electrical circuit comprising at least one electrical component and at least one power lead to said component;

the electrical component is selected from a heating element, a light source, a vibrating element, a sensor, a device for controlling an airbag, and an element for connecting an external electrical component.

According to another aspect, embodiments of the invention also relate to a vehicle seat support element comprising an armature defining a frame, a suspension membrane as described above attached to the frame and extending therein, and a padding extending over the armature and the suspension membrane, said padding being applied against said suspension membrane.

BRIEF DESCRIPTION OF THE DRAWINGS

Other aspects and advantages of the invention will appear on reading the following description, given by way of example and made with reference to the appended drawings, wherein.

DETAILED DESCRIPTION

Figure 1:
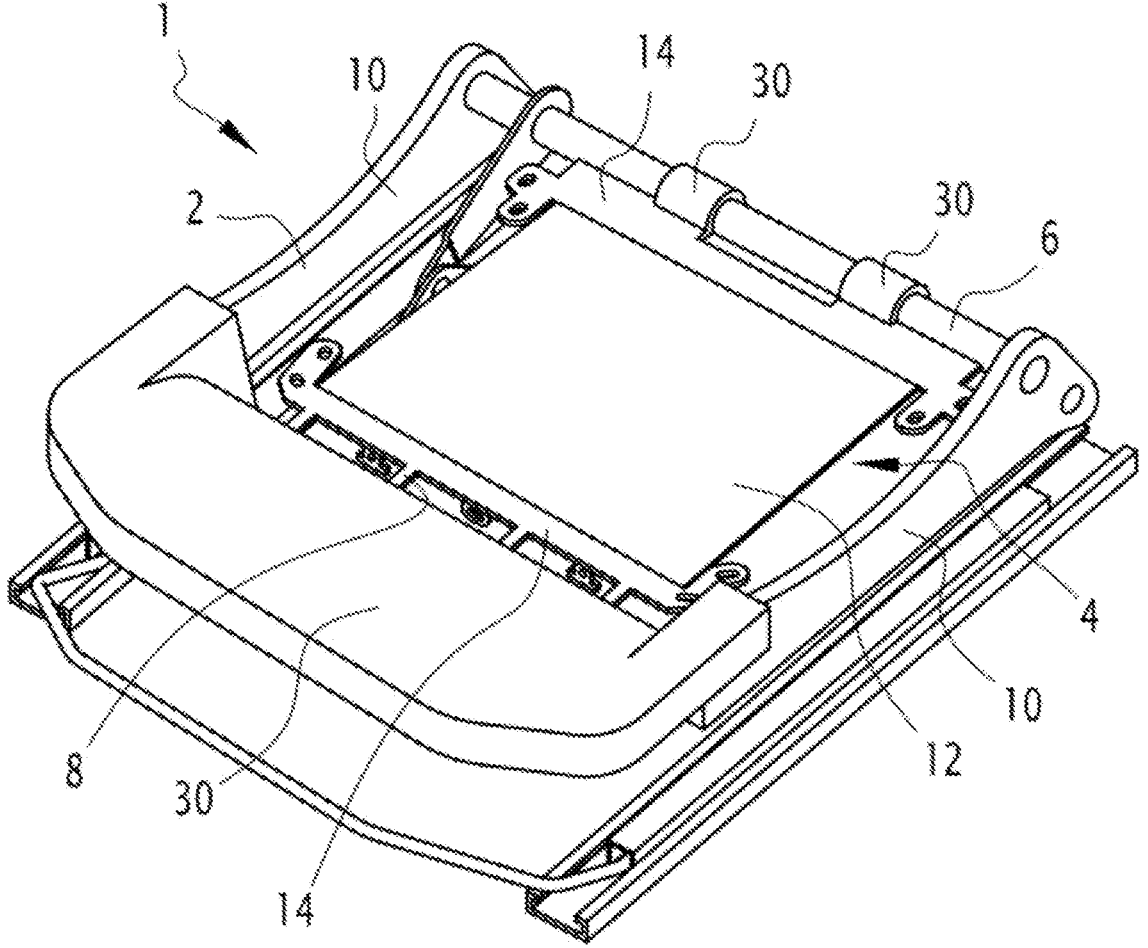
FIG. 1 is a schematic perspective view of part of a seat support element, comprising a suspension membrane according to an embodiment of the invention.

Referring to FIG. 1, a vehicle seat support element 1, comprising an armature 2, a suspension membrane 4 attached to and extending into the armature 2, and a padding (not shown) extending on the armature 2 and the suspension membrane 4 and applied against the suspension membrane 4, is described. Such a support element 1 forms for example a vehicle seat backrest. However, it is understood that the support element can form another part of the seat, such as the squab or headrest of the seat. It will be noted that, in FIG. 1, the backrest has been shown in a folded position in order to improve the visibility of the fastening between the armature 2 and the suspension membrane 4. It is understood that in normal use, the backrest is in a straightened position, wherein an occupant of the seat can bear against the backrest.

In the case of a backrest, in a conventional manner, the armature 2 forms a frame delimited by a lower cross-member 6, an upper cross-member 8 and two uprights 10 connecting the lower 6 and upper 8 cross-members.

The suspension membrane 4 extends into the frame formed by the armature 2 and is attached to the lower cross-member 6 on the one hand and to the upper cross-member 8 on the other hand. It is understood that, alternatively or additionally, the suspension membrane 4 can be attached to the two uprights 10. As shown in FIG. 1, the suspension membrane 4 occupies most of the space inside the frame, or even all the space inside the frame, in order to offer a large support surface for the padding and the back of the occupant of the seat in the case of a seat backrest. The suspension membrane 4 has mechanical characteristics enabling it to fulfill its suspension function, offering both support and shock absorption when a user presses on the bearing surface formed by the padding. Thus, the suspension membrane 4 has similar characteristics, in terms of rigidity and elasticity, which is obtained when a plurality of metal rods are tensioned within the armature of the backrest. Thus, the suspension membrane 4 is flexible and resiliently deformable to a certain extent. To this end, the suspension membrane 4 is for example substantially taut between the lower 6 and upper 8 cross-members and/or the uprights 10.

The suspension membrane 4 comprises a fabric made of plastic material 12 extending between at least two mounting elements 14 attached to opposite edges of the fabric 12. The fabric 12 confers on the suspension membrane 4 its mechanical characteristics described above and the mounting elements 14 allow the suspension membrane 4 to be fastened to the armature 2. The fabric 12 has almost the dimensions of the suspension membrane 4, and therefore occupies most of the space in the frame.

The fabric 12 extends between a first face and a second face, one of which is oriented toward the padding and the other of which is oriented toward the back of the support element. As is more particularly visible in FIG. 3, the fabric made of plastic material 12 comprises a first layer made of plastic material 16 and a second layer of plastic material 18 applied against one another to form the fabric 12. The first layer made of plastic material 16 and the second layer of plastic material 18 are for example formed by sheets of plastic material. The first and second layers 16, 18 have substantially the same dimensions, which are also the dimensions of the fabric 12. The mechanical characteristics of the fabric 12 are chosen so that the fabric 12 can carry out the function of the suspension membrane of a seat support element. Such features can be obtained by choosing the plastic material used to produce the first and second layers 16, 18, and/or by providing a suitable thickness for the fabric 12.

The first layer of plastic material 16 extends between an outer face, forming the first face of the fabric 12, and an inner face 20, opposite the outer face and oriented toward the second layer of plastic material 18. At least one electrical circuit 22 extends over part of the inner face 20 of the first layer of plastic material 16. The electrical circuit 22 comprises at least one electrical component 24, performing a particular function, and at least one power lead 26 making it possible to supply an electrical current and/or control signals to the electrical component 24.

The electrical component 24 may be of any nature suitable for performing a function in or on the support element 1 or around it. Thus, the electrical component 24 is for example chosen from a heating element, a light source, a vibrating element, a sensor, a device for controlling an airbag, an element for connecting an external electrical component or the like. It will be noted that in the case of a connection element, it is connected for example through the first layer made of plastic material 16 or the second layer of plastic material 18, for example by providing an opening in this layer opposite the connection element, since the electrical component 24 extends inside the fabric 12. Alternatively, the electrical component 24 may comprise a part, such as a connection interface, emerging outside the fabric 12, for example at the periphery of the fabric 12. It is understood that this list is not exhaustive and that other electrical components 24 can be envisaged.

Figure 4:
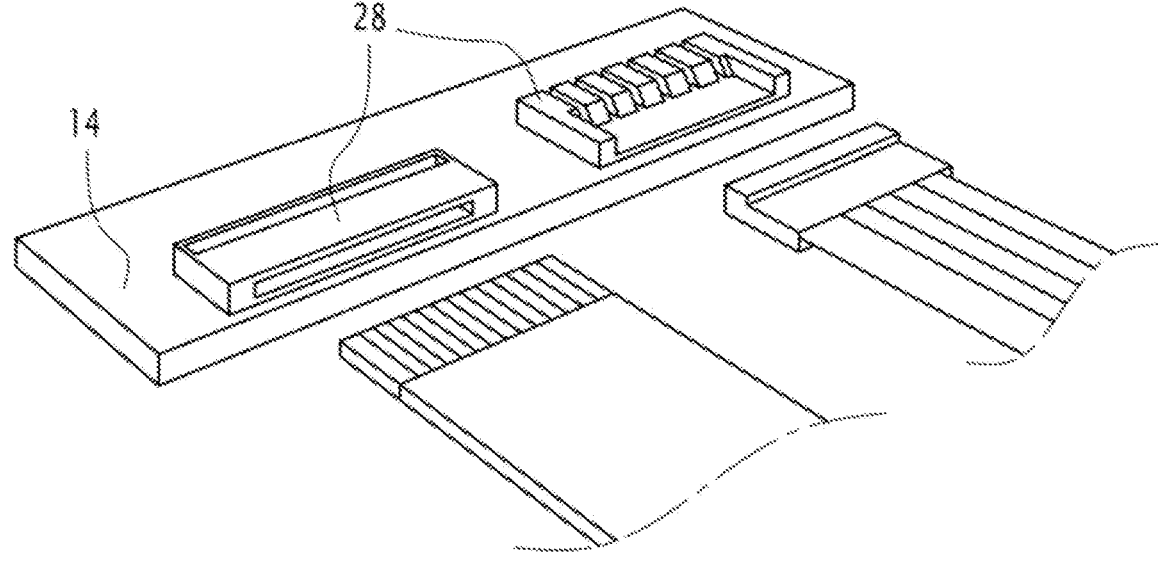
FIG. 4 is a detailed schematic perspective view of the suspension membrane of FIG. 2.

The power lead 26 extends from the electrical component 24 to a connection terminal 28, making it possible to connect the electrical circuit 22 to a power source and/or to a control device of the electrical circuit 22. The connection terminal 28 emerges outside the fabric 12, for example at the periphery thereof between the first layer 16 and the second layer 18. According to one embodiment, the connection terminal 18 is attached to one of the mounting elements 14. An example of connection terminals 28 is shown in FIG. 4, these connection terminals 28 potentially being connected to different types of external electrical components, such as a communication bus or a power supply, in order to connect the electrical circuit 22 to the electrical system of the vehicle, for example.

According to a particularly advantageous embodiment, the electrical circuit 22 is printed on the inner face 20 of the first layer made of plastic material 16, which makes it possible to produce the fabric 12 in a particularly simple manner, by printing the electrical circuit 22 on the inner face 20 of the first layer made of plastic material 16 and then by assembling, for example by bonding the first layer of plastic material 16 and the second layer of plastic material 18 by applying the inner face of the second layer of plastic material 18 to the inner face 20 of the first layer of plastic material 16. The printing of the electrical circuit 22 is done for example by using a conductive metal ink to produce leads on the inner face 20 of the first layer of plastic material 16.

Figure 2:
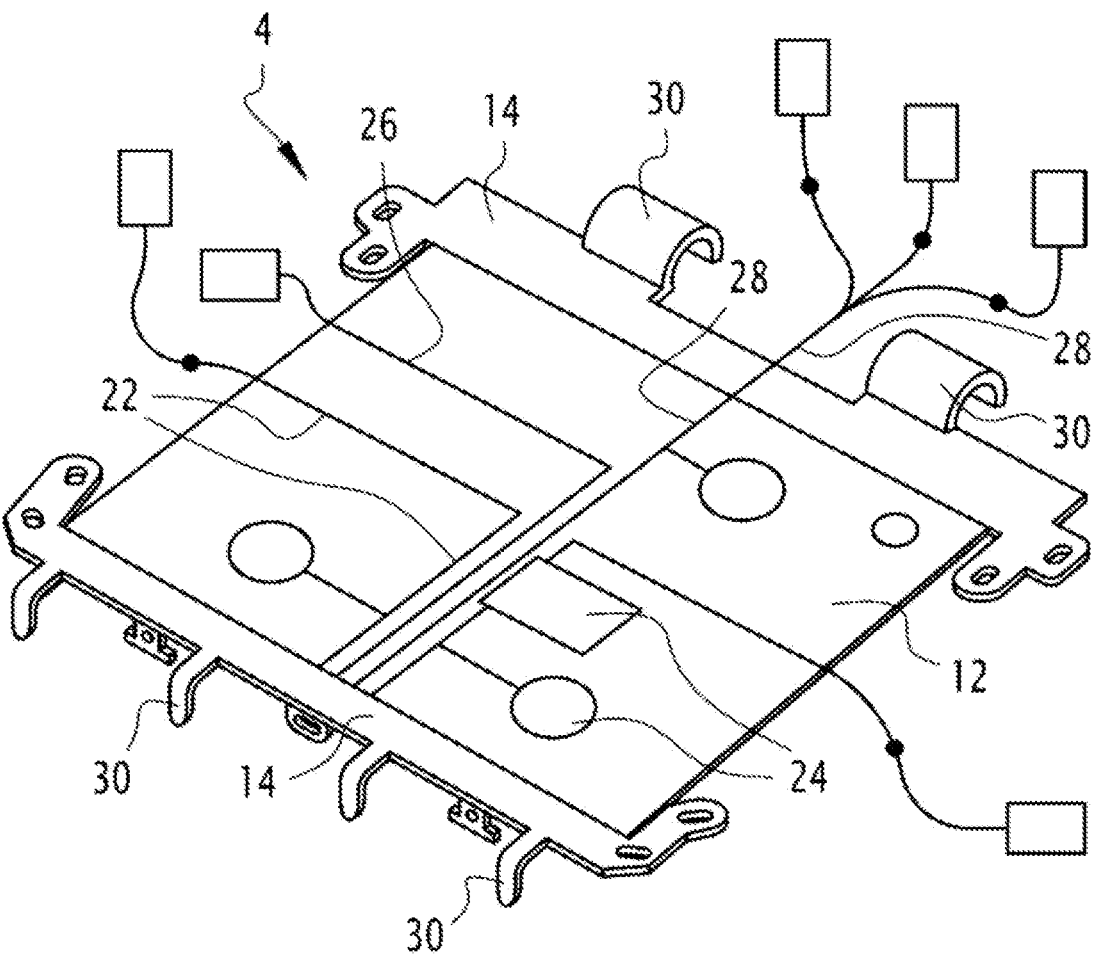
FIG. 2 is a schematic perspective view of a suspension membrane according to an embodiment of the invention.
Figure 3:
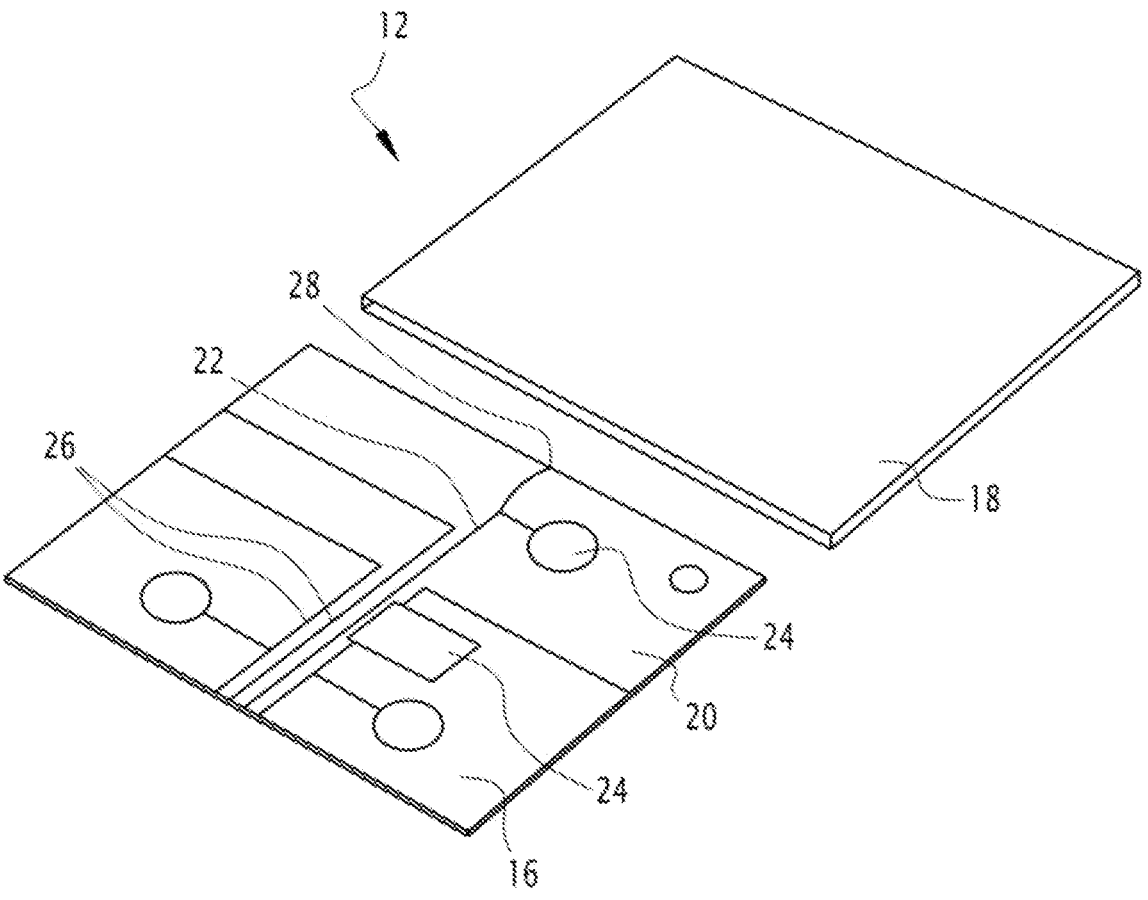
FIG. 3 is an exploded schematic perspective view of part of the suspension membrane of FIG. 2.

As shown in FIGS. 2 and 3, the fabric 12 may comprise a plurality of electrical circuits 22 in order to allow the fabric 12 to carry out various functions, in particular among those described above, by integrating a plurality of electrical components 24 into the fabric 12. All the electrical circuits 22 extend over the inner face 20 of the first layer made of plastic material and are for example produced simultaneously by printing. It is also understood that an electrical circuit 22 may comprise several electrical components 24 connected to each other by power leads 26. In FIG. 2, the various exterior connections of the electrical circuits 22 around the fabric 12 are schematically shown. It is understood, however, that advantageously, the connection terminals 28 of all or some of the electrical circuits are combined in a single location of the suspension membrane 4, for example on one of the mounting elements 14, in order to simplify the operations of connecting the electrical circuits 22 to the electrical system of the vehicle, as shown in FIG. 4.

According to a particularly advantageous embodiment, at least the first layer made of plastic material 16 and the electrical circuit(s) 22 provided thereon are produced by using a flexible printed circuit board, known as a "Flexible Circuit Board" (FCB). According to one embodiment, the FCB also incorporates the second layer made of plastic material 18, or this second layer of plastic material 18 is itself produced in the form of an FCB. Thus, the second layer made of plastic material may also comprise at least one electrical circuit extending on its face opposite the inner face 20 of the first layer made of plastic material.

It will be noted that the first layer made of plastic material 16 comprising at least one electrical circuit 22 can extend from the inner side of the support element, that is to say that the first face of the fabric 12 forms the inner face of the suspension membrane 4 oriented toward the support surface of the support element on which an occupant of the seat bears, or on the outer side of the support element, that is to say that the first face of the fabric 12 forms the outer face of the suspension membrane 4, opposite the inner face and oriented toward the back of the support element. When the first face of the fabric 12 forms the inner face, then the outer face of the second layer of plastic material 18, defining the second face of the fabric 12, forms the outer face of the suspension membrane 4, and conversely, when the first face of the fabric 12 forms the outer face, then the outer face of the second layer of plastic material 18 forms the outer face of the suspension membrane 4.

The mounting elements 14 of the suspension membrane 4 extend for example along two opposite edges of the fabric 12 in order to allow the fastening of the suspension membrane 4 to two opposite branches of the frame formed by the armature 2. According to the embodiment shown in FIG. 1 and as indicated above, the mounting elements 14 allow for example the fastening of the suspension membrane 4 onto the lower cross-member 6 and onto the upper cross-member 8 of the armature 2. To this end, each mounting element 14 comprises at least one attachment element 30 for attaching to the armature 2. Each mounting element 14 comprises for example a plurality of attachment elements 30 distributed along the mounting element 14 and being for example in the form of hooks that hook around the cross-members of the armature 2, as is more particularly visible in FIG. 1. It is understood that additional mounting elements 14 can be provided, for example to attach the suspension membrane 4 to the uprights 10 of the armature 2.

The mounting elements 14 are attached to the fabric 12, for example by overmolding. The mounting elements 14 are rigid and prevent the fabric 12 from being folded on itself along the direction wherein the mounting elements 14 extend. All or some of the connection terminals 28 of the electrical circuits are for example joined together on the mounting element 14 allowing the suspension membrane 4 to be attached the lower cross-member 6 of the armature 2 in order to bring those terminals 28 closer to the vehicle floor, which facilitates the connecting of the suspension membrane to the electrical system of the vehicle, which generally passes through the vehicle floor.

The suspension membrane 4 described above makes it possible to facilitate and accelerate the production of a support element 1 and to integrate in a simple way a large number of functionalities into the support element 1 since all the electrical components 24 can be joined together by a single piece in the fabric 12 of the suspension membrane 4, which makes it possible to assemble them in one go in the support element 1. It is however understood that the support element 1 may comprise one or more additional electrical circuits not integrated into the suspension membrane. Connecting the electrical components 24 to the electrical system of the vehicle can also be simplified by grouping together the connection terminals 28, for example on one of the mounting elements 14.

6

The invention claimed is:

1. A vehicle seat support element comprising:
an armature defining a frame;
a suspension membrane attached to opposite sides of the frame and extending into the frame; and
a padding extending over the frame and the suspension membrane, said padding being applied against said suspension membrane,
the suspension membrane comprising
a sheet made of plastic material extending between a first face and a second face and comprising
at least a first layer made of plastic material, the first layer comprising an outer face forming the first face and an inner face opposite the outer face, and
a second layer made of plastic material, the second layer comprising an outer face forming the second face and an inner face opposite the outer face, the inner faces of the first layer and of the second layer being applied against one another, and
at least one electrical circuit comprising at least one electrical component and a power lead to said component, the power lead extending between a part of the inner faces of the first layer and of the second layer,
wherein the suspension membrane is taut between said opposite sides of the frame such that the suspension membrane is flexible and resiliently deformable to provide support and shock absorption relative to the frame when a user presses against a bearing surface of the padding.

2. The vehicle seat support element according to claim 1, wherein the electrical circuit is printed on the inner face of the first layer.

3. The vehicle seat support element according to claim 2, wherein the first layer and the electrical circuit form a flexible printed circuit board.

4. The vehicle seat support element according to claim 1, wherein the electrical circuit is made of a conductive metal material.

5. The vehicle seat support element according to claim 1, wherein the electrical circuit comprises at least one connection terminal electrically connected to the power lead, said connection terminal emerging outside the sheet made of plastic material.

6. The vehicle seat support element according to claim 1, wherein the sheet made of plastic material extends between at least two rigid mounting elements attached to opposite edges of the sheet made of plastic material, said sheet being taut between said mounting members.

7. The vehicle seat support element according to claim 6, wherein the mounting elements each comprise at least one attachment element for attaching the suspension membrane to the armature.

8. The vehicle seat support element according to claim 1, wherein the at least one electrical circuit is a plurality of electrical circuits extending between different parts of the inner faces of the first layer and second layer, each electrical circuit comprising at least one electrical component and at least one power lead to said component.

9. The vehicle seat support element according to claim 1, wherein the electrical component is selected from a heating element, a light source, a vibrating element, a sensor, a device for controlling an airbag, and an element for connecting an external electrical component.

10. The vehicle seat support element according to claim 1, wherein the sheet extends between at least two rigid mounting elements attached to opposite edges of the sheet, and wherein the electrical circuit comprises at least one connection terminal electrically connected to the power lead and attached to one of the mounting elements.

\* \* \* \* \*